US012770080B2

United States Patent

(12) United States Patent
Yokose et al.

(10) Patent No.: US 12,770,080 B2
(45) Date of Patent: Oct. 20, 2026

(54) TOPIC DIVISION DETERMINATION DEVICE, TOPIC DIVISION DETERMINATION METHOD, AND TOPIC DIVISION DETERMINATION PROGRAM

(71) Applicant: NTT, Inc.

(72) Inventors: Fumihiro Yokose, Tokyo (JP); Kimio Tsuchikawa, Tokyo (JP); Sayaka Yagi, Tokyo (JP); Yuki Urabe, Tokyo (JP); Taisuke Wakasugi, Tokyo (JP); Haruo Oishi, Tokyo (JP)

(73) Assignee: NTT, Inc., Tokyo (JP)

( * ) Notice: Subject to any disclaimer, the term of this patent is extended or adjusted under 35 U.S.C. 154(b) by 184 days.

(21) Appl. No.: 18/568,369

(22) PCT Filed: Jun. 11, 2021

(86) PCT No.: PCT/JP2021/022418
§ 371 (c)(1),
(2) Date: Dec. 8, 2023

(87) PCT Pub. No.: WO2022/259559
PCT Pub. Date: Dec. 15, 2022

(65) Prior Publication Data
US 2024/0296404 A1 Sep. 5, 2024

(51) Int. Cl.
*G06Q 10/0633* (2023.01)

(52) U.S. Cl.
CPC ................................ *G06Q 10/0633* (2013.01)

(58) Field of Classification Search
CPC ........................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 7,801,886 B1 * | 9/2010 | Gabriel | G06F 16/20 | 707/715 |
| 2013/0263156 A1 * | 10/2013 | Nakagawa | G06F 9/542 | 719/318 |
| 2015/0081706 A1 * | 3/2015 | Elmqvist Wulcan | G05B 19/0428 | 707/746 |
| 2016/0065884 A1 * | 3/2016 | Di Censo | G06F 3/005 | 386/227 |
| 2017/0228265 A1 * | 8/2017 | Kimura | G06F 11/3024 | |
| 2017/0351719 A1 * | 12/2017 | Ward | G06F 16/2322 | |
| 2020/0057906 A1 * | 2/2020 | Tora | G06F 11/30 | |
| 2021/0271993 A1 * | 9/2021 | Kimura | G06N 5/042 | |
| 2021/0334188 A1 * | 10/2021 | Xia | G06F 11/3075 | |

FOREIGN PATENT DOCUMENTS

JP 2003331089 A 11/2003

OTHER PUBLICATIONS

Yokose et al. (2020) "Business visualization technology that contributes to the promotion of DX" NTT Technical Journal, vol. 32, No. 2, pp. 72-75.

* cited by examiner

*Primary Examiner* — Alan S Miller

(57) ABSTRACT

A determination device (10) receives designation of a division position of a log, and creates a rule for determining the division position of the log on the basis of a relationship between attribute values of log events before and after the received division position. Then, the determination device (10) determines a division position of a log to be processed by using the created rule.

17 Claims, 13 Drawing Sheets

Fig. 2

| DATE AND TIME | OPERATION TYPE | URL | TITLE | tag Name | type | id | value | name | Class Name | left | top | width | height |
|---|---|---|---|---|---|---|---|---|---|---|---|---|---|
| 2021/03/10 12:02:10 | "input" | "http://www.sample.jp/transit/?session=0001" | "ROUTE SEARCH" | "input" | "text" | null | "YRP NOBI" | "on_st" | null | 217 | 84 | 195 | 24 |
| 2021/03/10 12:02:52 | "input" | "http://www.sample.jp/transit/?session=0001" | "ROUTE SEARCH" | "input" | "text" | null | "TSUKUBA" | "off_st" | null | 217 | 120 | 195 | 24 |
| 2021/03/10 12:03:23 | "select" | "http://www.sample.jp/transit/?session=0001" | "ROUTE SEARCH" | "select" | null | null | "13" | "Time_Hour" | null | 217 | 228 | 54 | 24 |
| 2021/03/10 12:03:36 | "select" | "http://www.sample.jp/transit/?session=0001" | "ROUTE SEARCH" | "select" | null | null | "15" | "Time_Minute" | null | 271 | 228 | 54 | 24 |
| 2021/03/10 12:03:59 | "click" | http://www.hoge.jp/info/ | "INFORMATION CONFIRMATION" | "a" | null | null | null | null | null | 250 | 303 | 224 | 10 |
| 2021/03/10 12:04:42 | "click" | http://www.hoge.jp/info/ | "INFORMATION CONFIRMATION" | "button" | "button" | "id_001" | null | null | null | 524 | 620 | 150 | 32 |
| 2021/03/10 12:05:06 | "check" | "http://www.sample.jp/transit/?session=0001" | "ROUTE SEARCH" | "input" | "radio" | null | "1" | "sr" | null | 280 | 268 | 13 | 13 |
| 2021/03/10 12:05:19 | "click" | "http://www.sample.jp/transit/?session=0001" | "ROUTE SEARCH" | "input" | "submit" | null | "SEARCH" | null | null | 239 | 372 | 120 | 32 |
| ⋮ | ⋮ | ⋮ | ⋮ | ⋮ | ⋮ | ⋮ | ⋮ | ⋮ | ⋮ | ⋮ | ⋮ | ⋮ | ⋮ |

Fig. 4

| ATTRIBUTE ELEMENT | DETERMINATION METHOD USED |
|---|---|
| DATE AND TIME | D. NOT USED FOR DETERMINATION |
| OPERATION TYPE | A. DETERMINE CHARACTER STRING BY EXACT MATCH |
| URL | B. DETERMINE CHARACTER STRING BY PARTIAL MATCH |
| TITLE | B. DETERMINE CHARACTER STRING BY PARTIAL MATCH |
| tagName | A. DETERMINE CHARACTER STRING BY EXACT MATCH |
| type | A. DETERMINE CHARACTER STRING BY EXACT MATCH |
| id | A. DETERMINE CHARACTER STRING BY EXACT MATCH |
| value | D. NOT USED FOR DETERMINATION |
| name | A. DETERMINE CHARACTER STRING BY EXACT MATCH |
| className | D. NOT USED FOR DETERMINATION |
| left | D. NOT USED FOR DETERMINATION |
| top | D. NOT USED FOR DETERMINATION |
| width | C. PERFORM DETERMINATION BY NUMERICAL RANGE |
| height | C. PERFORM DETERMINATION BY NUMERICAL RANGE |

Fig. 12

| DATE AND TIME | OPERATION TYPE | URL | TITLE | tag Name | type | id | value | name | Class Name | left | top | width | height |
|---|---|---|---|---|---|---|---|---|---|---|---|---|---|
| 2021/03/10 12:02:10 | "input" | "http://www.sample.jp/transit/?session=0001" | "ROUTE SEARCH" | "input" | "text" | null | "YRP NOBI" | "on_st" | null | 217 | 34 | 195 | 24 |
| 2021/03/10 12:02:52 | "input" | "http://www.sample.jp/transit/?session=0001" | "ROUTE SEARCH" | "input" | "text" | null | "TSUKUBA" | "off_st" | null | 217 | 120 | 195 | 24 |
| 2021/03/10 12:03:23 | "select" | "http://www.sample.jp/transit/?session=0001" | "ROUTE SEARCH" | "select" | null | null | "13" | "Time_Hour" | null | 217 | 228 | 54 | 24 |
| 2021/03/10 12:03:36 | "select" | "http://www.sample.jp/transit/?session=0001" | "ROUTE SEARCH" | "select" | null | null | "15" | "Time_Minute" | null | 271 | 228 | 54 | 24 |
| 2021/03/10 12:03:59 | "click" | http://www.hoge.jp/info/ | "INFORMATION CONFIRMATION" | "a" | null | null | null | null | null | 250 | 303 | 224 | 10 |
| 2021/03/10 12:04:42 | "click" | http://www.hoge.jp/info/ | "INFORMATION CONFIRMATION" | "button" | "button" | "id_001" | null | null | null | 524 | 320 | 150 | 32 |
| 2021/03/10 12:05:06 | "check" | "http://www.sample.jp/transit/?session=0001" | "ROUTE SEARCH" | "input" | "radio" | null | "1" | "ar" | null | 280 | 268 | 13 | 13 |
| 2021/03/10 12:05:19 | "click" | "http://www.sample.jp/transit/?session=0001" | "ROUTE SEARCH" | "input" | "submit" | null | "SEARCH" | null | null | 239 | 372 | 120 | 32 |
| ⋮ | ⋮ | ⋮ | ⋮ | ⋮ | ⋮ | ⋮ | ⋮ | ⋮ | ⋮ | ⋮ | ⋮ | ⋮ | ⋮ |

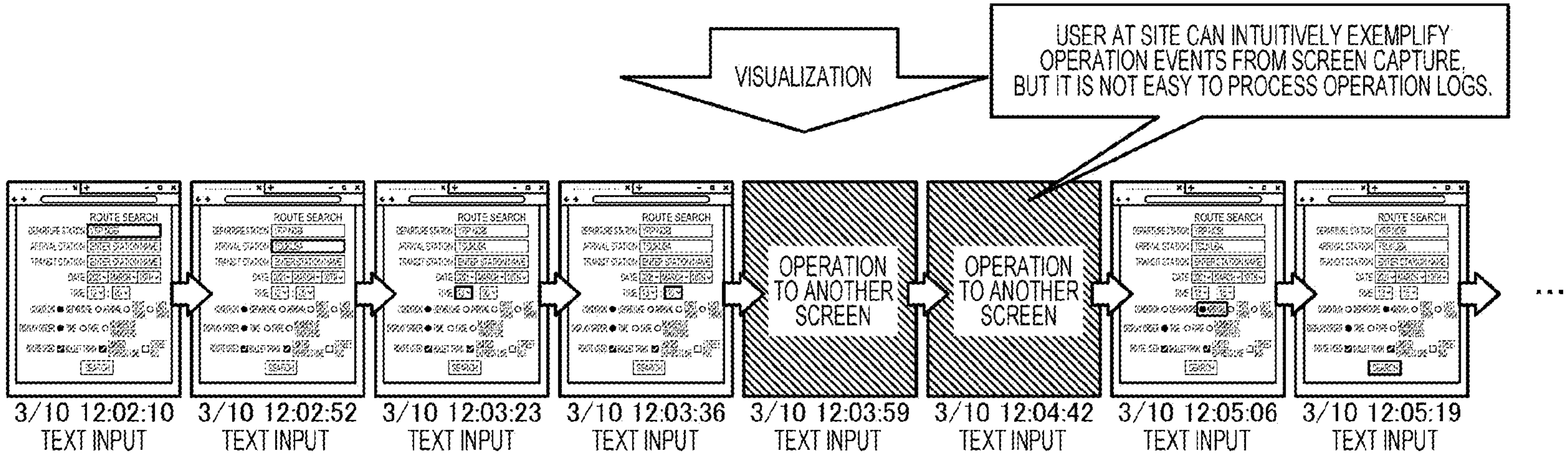

TOPIC DIVISION DETERMINATION DEVICE, TOPIC DIVISION DETERMINATION METHOD, AND TOPIC DIVISION DETERMINATION PROGRAM

CROSS-REFERENCE TO RELATED APPLICATIONS

This application is a U.S. 371 Application of International Patent Application No. PCT/JP2021/022418, filed on 11 Jun. 2021, the disclosure of which is hereby incorporated herein by reference in its entirety.

TECHNICAL FIELD

The present invention relates to a determination device, a determination method, and a determination program.

BACKGROUND ART

Conventionally, there has been known a process mining method of analyzing and visualizing a flow of work performed in business to find an improvement point in the business. Information used for analysis and visualization in such a process mining method is a log in which an event to be analyzed is recorded. For example, there are various events to be analyzed depending on a type of business and granularity to be analyzed, but for example, a GUI operation may be targeted, such as "clicking a button" or "inputting to a text box".

The log used for process mining needs to satisfy, for example, requirements that the log is "narrowed down to only information to be analyzed", "divided for each case", and "in a state where an event can be identified". For example, an operation log in which an operation on a PC is recorded often does not satisfy the requirements of the log used for the process mining. For that reason, when the process mining is performed, for example, the operation log needs to be processed to satisfy the requirements by three pieces of pre-processing, "removal of an unnecessary operation event", "determination of identical operation events", and "division in units of cases".

Here, processing of "division in units of cases" is processing of dividing a log for each case. That is, since the operation log is resident on a PC of a worker and records work, there is a case where the operation log is not divided for each case and an entire period in which the work is recorded is included in one log file, and thus, it is the processing of dividing the log for each case. Conventionally, in analysis and visualization of an operation on a personal computer for finding an improvement point in business, a person manually performs processing of dividing the operation log for each case, for example, by visually confirming the operation log and dividing the operation log into files in units of cases.

CITATION LIST

Non Patent Literature

Non Patent Literature 1: Yokose, Urabe, Yagi, et al., "Business visualization technology contributing to DX promotion", 2020, NTT Technical Journal, 2020 vol. 32 No. 2, p. 72-75, [online], [Searched on Apr. 23, 2021], Internet <https://journal.ntt.co.jp/article/880>

SUMMARY OF INVENTION

Technical Problem

However, in the conventional technique, there has been a problem that it is not possible to easily and efficiently perform division of the log in units of cases. For example, in a case where division of the operation log in units of cases is manually performed, it is necessary for a worker to understand an internal structure of a system and a meaning of an attribute value of the operation log, and further, it requires a large operation to handle a large amount of logs, and in addition, in a fixed rule algorithm, systems have different internal structures, so that there has been a problem that it is difficult to automatically divide the operation log in units of cases.

The present invention has been made in view of the above, and an object thereof is to provide a determination device, a determination method, and a determination program capable of easily and efficiently perform division of a log in units of cases.

Solution to Problem

To solve the above-described problems and achieve the object, a determination device of the present invention includes: a reception unit that receives designation of a division position of a log; a creation unit that creates a rule for determining the division position of the log on the basis of a relationship between attribute values of log events before and after the division position received by the reception unit; and a determination unit that determines a division position of a log to be processed by using the rule created by the creation unit.

In addition, a determination method of the present invention is a determination method executed by a determination device, the determination method including: a reception process of receiving designation of a division position of a log; a creation process of creating a rule for determining the division position of the log on the basis of a relationship between attribute values of log events before and after the division position received by the reception process; and a determination process of determining a division position of a log to be processed by using the rule created by the creation process.

In addition, a determination program of the present invention causes a computer to execute: a reception step of receiving designation of a division position of a log; a creation step of creating a rule for determining the division position of the log on the basis of a relationship between attribute values of log events before and after the division position received by the reception step; and a determination step of determining a division position of a log to be processed by using the rule created by the creation step.

Advantageous Effects of Invention

According to the present invention, it is possible to easily and efficiently perform division of a log in units of cases.

BRIEF DESCRIPTION OF DRAWINGS

FIG. 2 is a diagram illustrating an example of an operation log stored in an operation log storage unit.

FIG. 4 is a diagram illustrating examples of sub-rules.

FIG. 12 is a diagram for explaining a conventional problem.

DESCRIPTION OF EMBODIMENTS

Hereinafter, embodiments of a determination device, a determination method, and a determination program according to the present application will be described in detail with reference to the drawings. In addition, the present invention is not limited to the embodiments described below. Note that, in the following, processing in which the determination device determines a division position of an operation log will be described as an example, but not limited to the operation log, the present invention can also be applied to logs having other similar structures (for example, a reception/transmission history of a telephone, and the like).

[Configuration of Determination Device]

Figure 1:
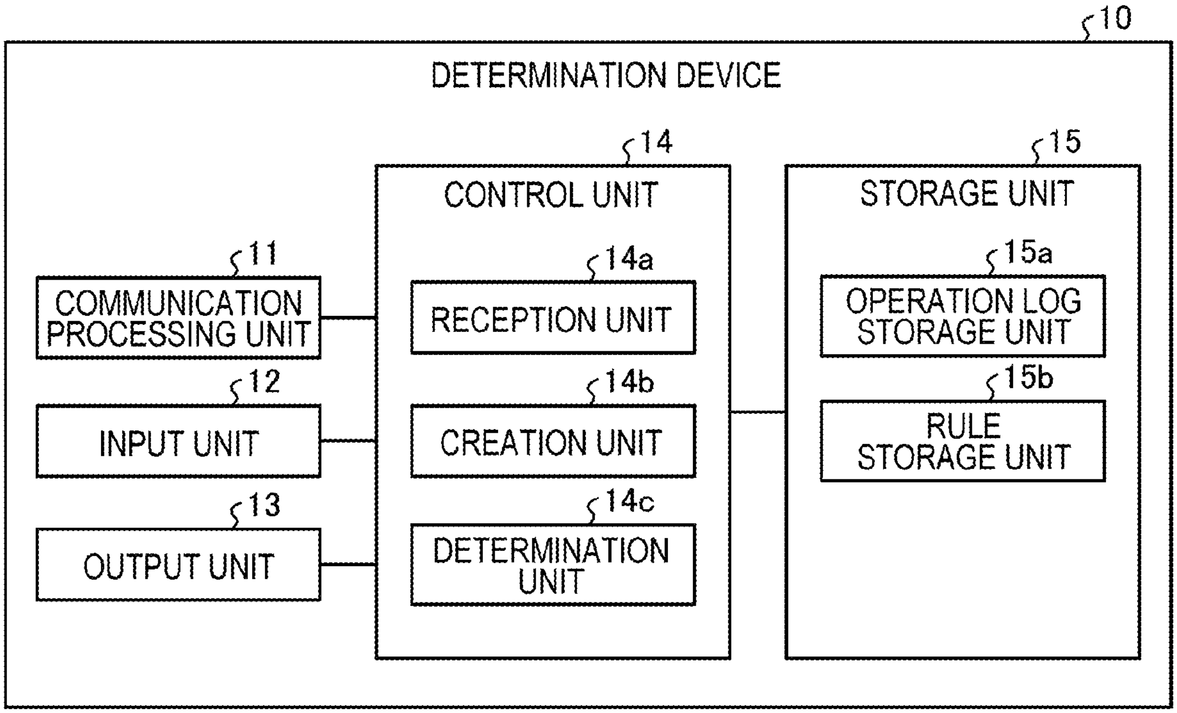
FIG. 1 is a block diagram illustrating a configuration of a determination device of a present embodiment.

FIG. 1 is a block diagram illustrating a configuration of the determination device of the present embodiment. As illustrated in FIG. 1, a determination device 10 of the present embodiment is implemented by a general-purpose computer such as a personal computer, and includes a communication processing unit 11, an input unit 12, an output unit 13, a control unit 14, and a storage unit 15.

The communication processing unit 11 is implemented by a network interface card (NIC) or the like, and controls communication between an external device and the control unit 14 via a telecommunication line such as a local area network (LAN) or the Internet. For example, the communication processing unit 11 receives an operation log to be processed from the external device.

The input unit 12 is implemented by using an input device such as a keyboard or a mouse and inputs various types of instruction information such as processing start to the control unit 14 in response to an input operation by an operator. The output unit 13 is implemented by a display device such as a liquid crystal display.

The storage unit 15 stores data and programs necessary for various types of processing by the control unit 14, and includes an operation log storage unit 15*a* and a rule storage unit 15*b*. For example, the storage unit 15 is a semiconductor memory device such as a random access memory (RAM) or a flash memory, or a storage device such as a hard disk or an optical disk.

The operation log storage unit 15*a* stores the operation log to be processed. For example, the operation log storage unit 15*a* stores, as the operation log, "occurrence time" of the operation, "unique information on an operated graphical user interface (GUI) component", and the like. In addition, in the operation log, information on one operation event is expressed as a collection of a plurality of attribute values (columns, items).

Here, the operation log stored in the operation log storage unit will be described with reference to FIG. 2. FIG. 2 is a diagram illustrating a log stored in the operation log storage unit. In the example of FIG. 2, to simplify the example, an operation log is assumed in which only an operation on a browser is recorded. For that reason, attribute values of the log indicate only those related to the browser.

Note that, in the operation log, in addition to a GUI operation on the PC, input by some input device may be recorded, or command input on a character-based user interface (CUI) may be recorded. In a case of recording these other types of operations, it is necessary to increase the number of log items as necessary.

As illustrated in FIG. 2, the operation log storage unit 15*a* stores "date and time", "operation type", "URL", "title", "tagName", "type", "id", "value", "name", "ClassName", "left", "top", "width", and "height". Note that operation logs to be stored are not limited to those described above, and the operation log storage unit 15*a* may also store, for example, image capture or the like at the time of operation.

In the example of FIG. 2, in a case where an item of an operation is not set or cannot be acquired, the operation log storage unit 15*a* stores a "null" value indicating that a value of the operation is not set. Note that an attribute element included in the operation log does not need to be directly acquired information itself, and may be processed, obtained by combining a plurality of pieces of information, or processed by using information not included in the operation log finally. In addition, the operation log storage unit 15*a* stores the operation logs in chronological order of events so that the order of the events occurring in work can be known.

The rule storage unit 15*b* stores a rule for determining the division position of the operation log, the rule being created by a creation unit 14*b* described later. In addition, the rule storage unit 15*b* may store a sub-rule used by the creation unit 14*b* described later. Note that it is assumed that the sub-rule is preset manually or automatically.

The control unit 14 includes an internal memory for storing a program defining various processing procedures and the like and required data, and executes various types of processing using the program and the data. For example, the control unit 14 includes a reception unit 14*a*, the creation unit 14*b*, and a determination unit 14*c*. Here, the control unit 14 is an electronic circuit such as a central processing unit (CPU) or a micro processing unit (MPU), or an integrated circuit such as an application specific integrated circuit (ASIC) or a field programmable gate array (FPGA).

The reception unit 14*a* receives designation of the division position of the operation log. For example, the reception unit 14*a* acquires the operation log from the operation log storage unit 15*a*, and causes a user to select one or more sets of a start and an end of a cutout of one case as exemplifications. A method of receiving the designation may be any method, and for example, the reception unit 14*a* may cause the user to select the cutout as range designation such as a drag & drop operation instead of designating the start and the end. Alternatively, the user may be caused to designate only the division position instead of the start and the end. However, in this case, a length rule described later cannot be estimated.

Figure 3:
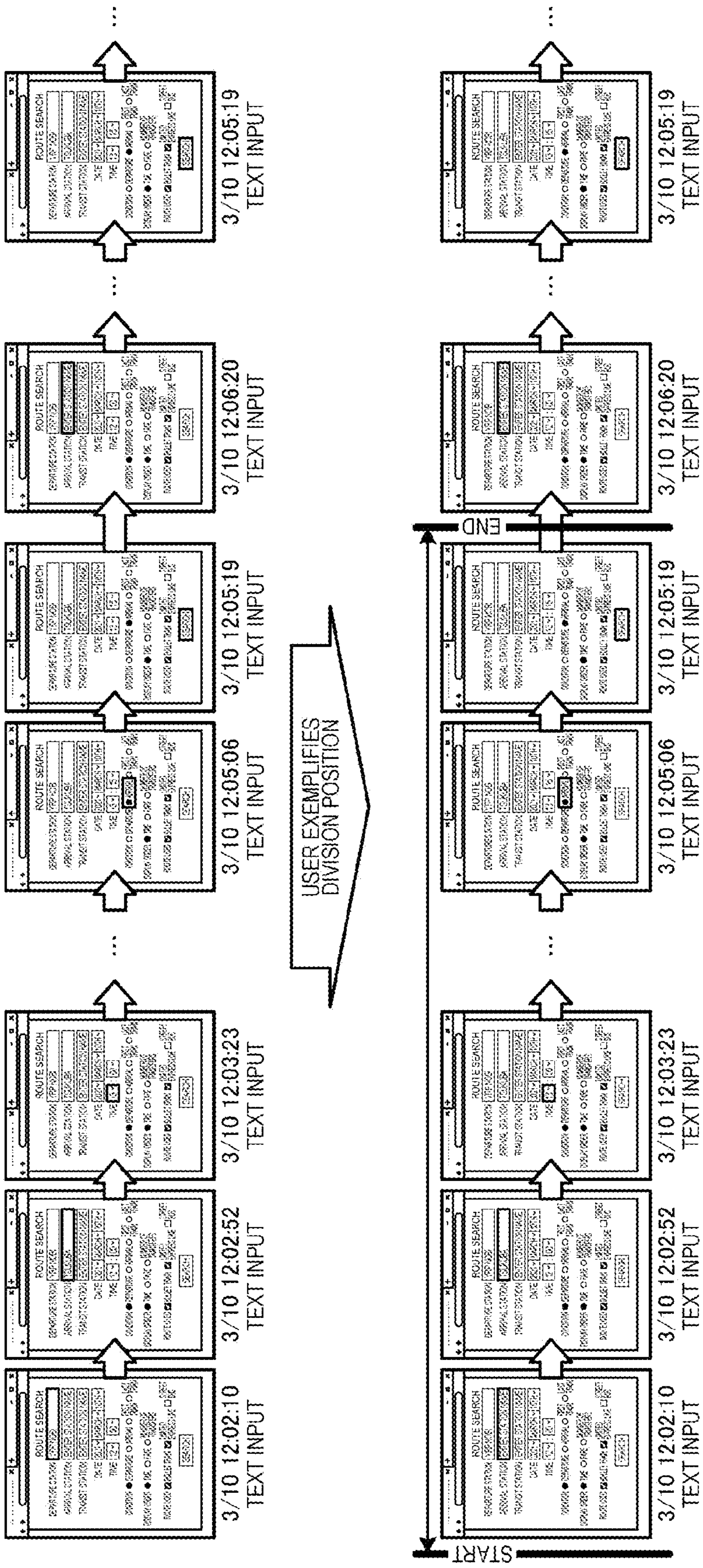
FIG. 3 is a diagram for explaining an example of processing of receiving designation of a division position by a user.

For example, as illustrated in FIG. 3, the reception unit 14*a* may visually display the operation events chronologically and receive the designation of the division position from the user. FIG. 3 is a diagram for explaining an example of processing of receiving the designation of the division position by the user. In the example of FIG. 3, one operation event is displayed as one node. The reception unit 14*a* displays, on the node, a captured image simultaneously recorded with recording of the operation event, and displays, on the image, an operation position in a red frame. With this display, the user can designate the division position while recognizing which specific operation each operation event is without understanding contents recorded in the operation log. Note that a set of operation events divided due to receiving the designation of the division position from the user will be appropriately described as "exemplified cases" below.

The creation unit 14*b* creates a rule for determining the division position of the operation log on the basis of a relationship between attribute values of the operation events before and after the division position received by the reception unit 14*a*. In addition, the creation unit 14*b* may create the rule for determining the division position of the operation log on the basis of the length from the start to the end of the operation log divided by the division position received by the reception unit 14*a* and the relationship between the attribute values of the operation events before and after the division position received by the reception unit 14*a*.

Hereinafter, a case will be described where the creation unit 14*b* creates three rules of (1) a length rule, (2) an attribute element rule common to a piece after n pieces from the start and a piece before m pieces from the end, and (3) an attribute element rule common to N' pieces after the start and M' pieces before the end. Note that, not limited to a case of creating all three rules, the creation unit 14*b* may create only the rules of (2) or (3), for example. In addition, the creation unit 14*b* may create a rule other than the above three rules.

For example, the creation unit 14*b* calculates an average $\mu$ and a standard deviation $\sigma$ for lengths of a plurality of exemplified cases, and creates, as (1) the length rule, the average $\mu$ and the standard deviation $\sigma$ as a rule. Note that, in a case where only one case is exemplified or the standard deviation $\sigma$ is small, this length rule may be rejected or the standard deviation $\sigma$ may be preset to ⅓ of the average $\mu$ or the like.

A matching method at the time of division processing of the created rule (1) will be described. At the time of division processing, in a case where the length of a test target case satisfies the following expression, it is regarded that the present rule is matched.

$$\mu-k\sigma \leq (\text{length of test target}) \leq \mu+k\sigma$$

Here, k is a constant and is arbitrarily determined. In a case where it is assumed that variation of values follows a normal distribution, k=3 (range of 99.7%) is generally preferable. In a case where the present rule is matched, a certain score (for example, 10 points) is added. The score may be constant, but may be reduced from the average $\mu$ in accordance with a linear or some function depending on an amount of deviation.

For the rule (2), the creation unit 14*b* estimates an attribute element common to an event after a predetermined number of events from the start of each operation log divided by the division position received by the reception unit 14*a*, and an attribute element common to an event before a predetermined number of events from the end, and creates the common attribute elements as rules. In a case where only the division position of the case is caused to be exemplified instead of causing the start and the end to be exemplified for each case, the processing is performed assuming that the exemplified division position serves as both the end of the case before the division position and the start of the case after the division position.

For example, for the rule (2), the creation unit 14*b* estimates an attribute element common to an event after n events from the start, and creates the common attribute element as a rule. In this case, the creation unit 14*b* sets events up to a certain number of (N) events after the start as a target of rule calculation. In addition, for example, the creation unit 14*b* estimates an attribute element common to an event before m events from the end, and creates the common attribute element as a rule. In this case, the creation unit 14*b* sets events up to a certain number of (M) events before the end as a target of rule calculation. Note that a sub-rule for determining the common attribute element will be described later.

A matching method at the time of division processing of the created rule (2) will be described. At the time of division processing, the determination unit 14*c* described later determines whether all adopted sub-rules match for a test target operation event. Then, in a case where all the adopted sub-rules match, the determination unit 14*c* adds a certain score (for example, 5 points) for one operation event. Alternatively, instead of a case where all the adopted sub-rules match, the determination unit 14*c* may add a certain score (for example, 1 point) to one attribute of an event of one matched sub-rule.

For the rule (3), the creation unit 14*b* estimates an attribute element common to events in a range up to an event after a predetermined number of events from the start of each operation log divided by the division position received by the reception unit 14*a*, and an attribute element common to events in a range up to an event before a predetermined number from the end, and creates the common attribute elements as rules.

For example, for the rule (3), the creation unit 14*b* estimates an attribute element common to events in a range up to an event after N' events from the start, and creates the common attribute element as a rule. In addition, for example, the creation unit 14*b* estimates an attribute element common to events in a range up to an event before M' events from the end, and creates the common attribute element as a rule. Note that a sub-rule for determining the common attribute element will be described later.

A matching method at the time of division processing of the created rule (3) will be described. At the time of division processing, the determination unit 14*c* described later determines whether an adopted sub-rule matches for the test target operation event. Then, the determination unit 14*c* determines a match for all the events in the range up to the event after N' events for the starting side of the test target case. In addition, the determination unit 14*c* determines a match for all the events in the range up to the event before M' events for the end side of the test target case. Then, in a case where the present rule is matched, the determination unit 14*c* adds a certain score (for example, 1 point) to one attribute of one event. Alternatively, the determination unit 14*c* may add a certain score (for example, 5 points) for an event matching all the adopted attribute values.

Here, a sub-rule for determining the common attribute element will be described with reference to FIG. 4. FIG. 4 is a diagram illustrating examples of sub-rules. As illustrated in FIG. 4, in the sub-rules, a type of an attribute element and a rule type to be used are associated with each other. In the sub-rules, in accordance with a nature of each attribute value of the operation event, it is defined which sub-rule is applied among "A. Determine a character string by an exact match", "B. Determine a character string by a partial match", "C. Perform determination by a numerical range", and "D. Not used for determination". Note that the sub-rules are not limited to these, and for example, some of these four types of sub-rules may not be used, or other types of rules may be added. Each of the four types of sub-rules will be described below.

First, the sub-rule "A. Determine a character string by an exact match" will be described. For the method of setting the sub-rule, for example, in a case where all the attribute values do not exactly match in a plurality of operation events exemplified by the user, the present sub-rule is rejected for the corresponding attribute element. In addition, in the plurality of operation events exemplified by the user, a character string that exactly matches in all the attribute values is set as a parameter of the present sub-rule. In addition, in a case where it is not necessary to distinguish between upper case and lower case, parameters are converted into upper case or lower case and unified. In addition, also in a case where all the attribute values are null in the identical operation set exemplified by the user, the present sub-rule is adopted for the corresponding attribute element.

In the sub-rule "A. Determine a character string by an exact match", in a case where the corresponding attribute value of the operation event to be inspected exactly matches the character string found by the rule estimation described above, it is determined that the present sub-rule is a match. In addition, in a case where it is not necessary to distinguish between upper case and lower case, comparison is performed using a value obtained by converting the corresponding attribute value into upper case or lower case, similarly to the parameters.

Next, the sub-rule "B. Determine a character string by a partial match" will be described. For the method of setting the sub-rule, for example, in a case where null is included in the corresponding attribute value in a plurality of operation event sets exemplified by the user, the present sub-rule is rejected for the corresponding attribute element.

In addition, a common partial character string is found in the plurality of operation event sets exemplified by the user. In the simplest mechanism, the longest common partial character string commonly included in all events is found and used as a parameter of the present sub-rule. In a case where the number of characters of the common partial character string is less than or equal to a threshold number of characters, the present sub-rule is rejected. The threshold can be arbitrarily set, but for example, in a case of a URL, a portion of "http://" or "https://" at the head is always common, and thus, to exceed this, it is only required to reject the common partial character string of less than or equal to eight characters. To perform more advanced processing, information regarding true/false of "forward match", "backward match", "partial match", and "exact match" may be considered, a plurality of common parts may be considered, or a character string length may be considered.

In the sub-rule "B. Determine a character string by a partial match", in a case where the corresponding attribute value of the operation event to be inspected includes the common partial character string found by the rule estimation described above, it is determined that the present sub-rule is a match.

Next, the sub-rule "C. Perform determination by a numerical range" will be described. For the method of setting the sub-rule, for example, in a plurality of operation event sets exemplified by the user, "in a case where null is included in the corresponding attribute value", "in a case where a value that cannot be handled as a numerical value is included in the corresponding attribute value", or "in a case where another abnormal value is included in the corresponding attribute value (example: width is a negative value)", the present sub-rule is rejected for the corresponding attribute element. In addition, for example, the average μ and the standard deviation σ are calculated in the plurality of operation event sets exemplified by the user, and are used as parameters of the present sub-rule. In addition, in a case where the standard deviation σ is greater than or equal to a certain threshold, or in a case where a sufficient number of operation events are not exemplified (only one operation event is exemplified), the present sub-rule may be rejected. For example, in a case where the threshold is set to 30, and in a case where the standard deviation σ is greater than or equal to 30, it is regarded that the variation is large and there is almost no commonality, and the rule is rejected.

In the sub-rule "C. Perform determination by a numerical range", in a case where the corresponding attribute value of the operation event to be inspected falls within a range defined by the following expression, it is determined that the present sub-rule is a match (matched).

$$\mu - k\sigma \leq \text{attribute value} \leq \mu + k\sigma$$

Here, k is a constant and is arbitrarily determined. In a case where it is assumed that variation of values follows a normal distribution, k=3 (range of 99.7%) is generally preferable.

Figure 5:
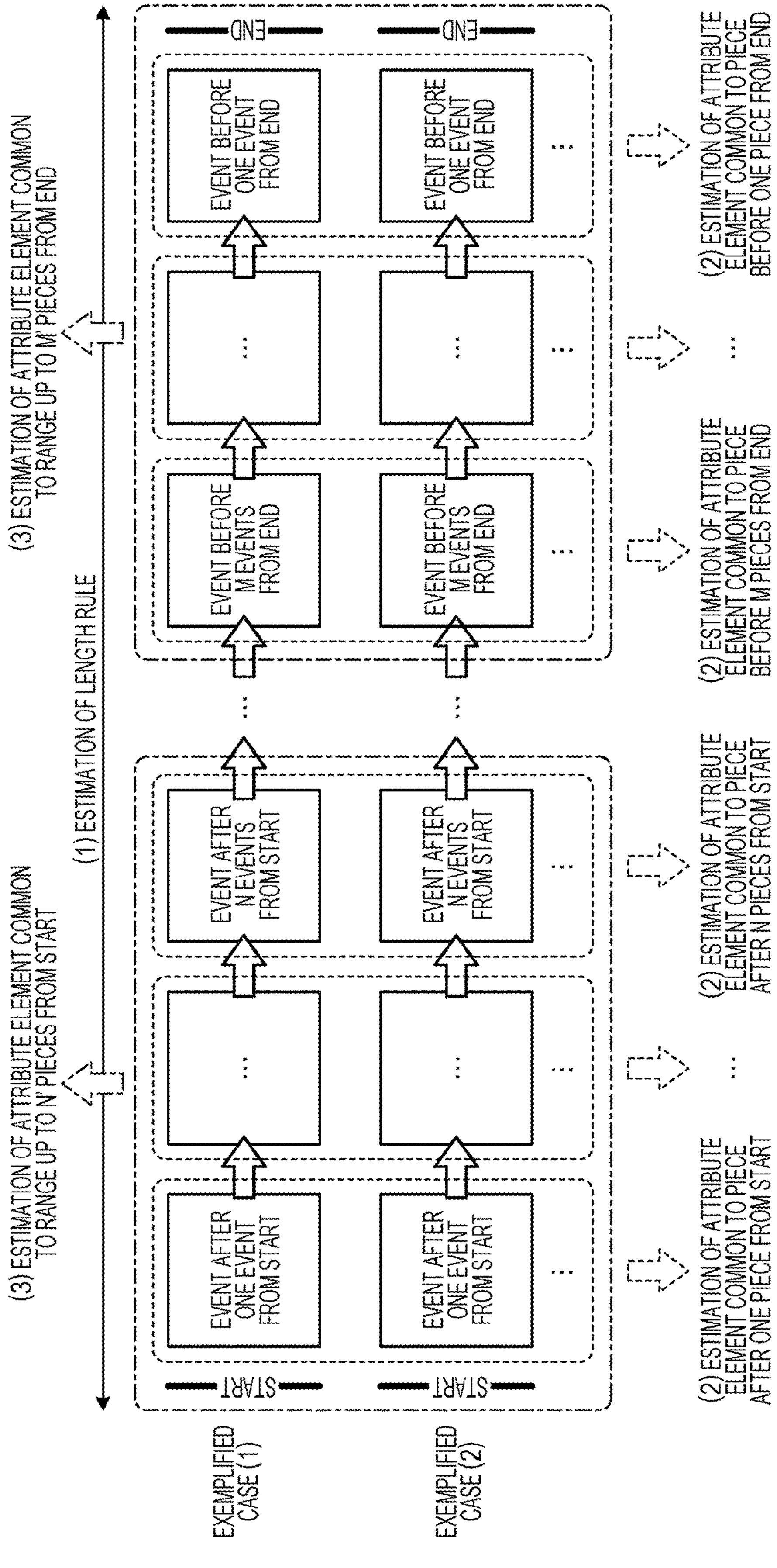
FIG. 5 is a diagram for explaining an example of rule creation processing.

Next, rule creation processing by the creation unit 14*b* will be described with reference to FIG. 5. FIG. 5 is a diagram for explaining an example of the rule creation processing. The creation unit 14*b* creates the rules of (1) to (3) described above from data of the exemplified cases as illustrated in FIG. 5.

That is, for example, for (1) the length rule, the creation unit 14*b* calculates the average μ and the standard deviation σ for the length of each exemplified case, and creates the average μ and the standard deviation σ as a rule.

In addition, for the rule (2) described above, the creation unit 14*b* sets events up to an event after a certain number of (N) events from the start as targets of rule calculation, estimates an attribute element common to each of the events after 1 to N events from the start, and creates the common attribute element as a rule. In addition, for the rule (2), the creation unit 14*b* sets events up to an event before a certain number of (M) events from the end as targets of rule calculation, estimates an attribute element common to each of the events before 1 to M events from the end, and creates the common attribute element as a rule.

In addition, for the rule (3), the creation unit 14*b* estimates an attribute element common to events in a range up to an event after N' events from the start, and creates the common attribute element as a rule. In addition, for example, the creation unit 14*b* estimates an attribute element common to events in a range up to an event before M' events from the end, and creates the common attribute element as a rule.

Note that, in a case where the length of the exemplified case is short and "M+N>(the length of the exemplified shortest case)" or "M'+N'>(the length of the exemplified shortest case)", M, N, M', and N' may be automatically reduced. In addition, M, N, M', and N' may not be fixed values, and may be adjusted in accordance with an average of the lengths of the exemplified cases. In a case where all the rules are rejected or in a case where the number of adopted rules is less than or equal to a certain threshold (for example, in a case where the number of adopted rules is less than or equal to 10), it is determined that automatic creation is impossible.

Returning to the description of FIG. 2, the determination unit 14*c* determines the division position of the operation log to be processed by using the rule created by the creation unit 14*b*. Specifically, the determination unit 14*c* acquires the operation log to be processed from the operation log storage unit 15*a*, and acquires the rule for determining the division position of the operation log from the rule storage unit 15*b*. Here, the acquired operation log is the same as the operation log acquired by the reception unit 14*a* and for which the division position is designated. Note that the operation log for rule creation acquired by the reception unit 14*a* and the operation log to be subjected to division processing acquired by the determination unit 14*c* are not limited to those identical to each other, and may be different from each other.

Figure 6:
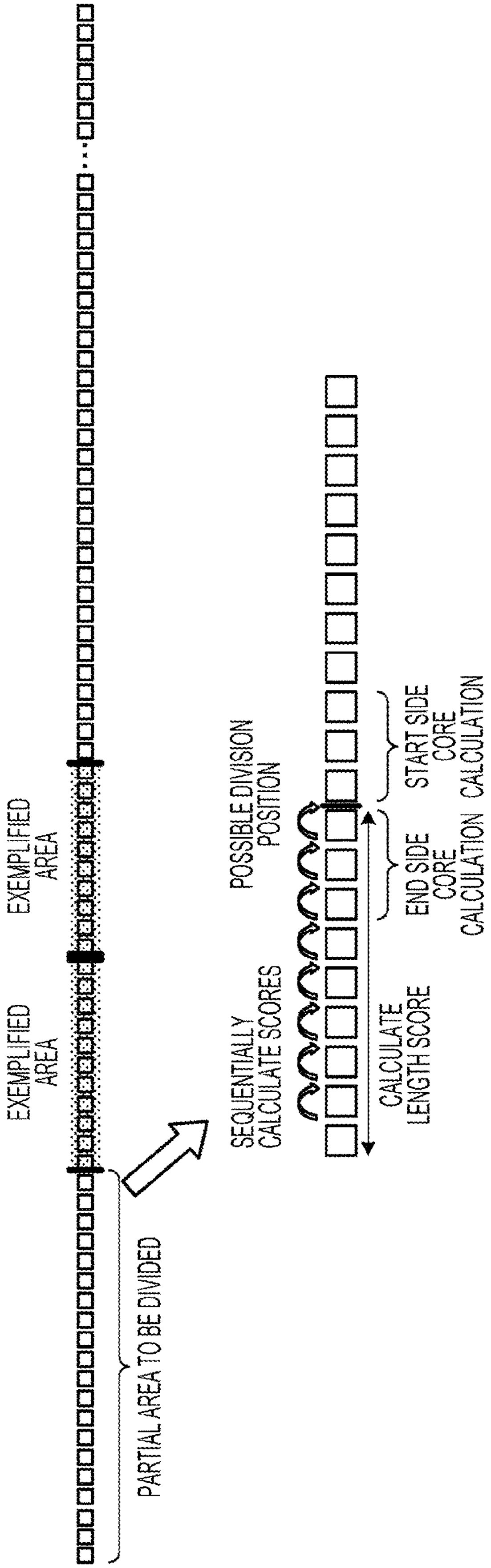
FIG. 6 is a diagram for explaining an example of automatic division processing for an operation log.

Then, as illustrated in FIG. 6, the determination unit 14*c* performs division processing for each partial area divided by the exemplified case area. The head of the partial area is automatically set as the start of the case. The determination unit 14*c* executes the matching method using the rule while shifting possible division positions after the head event one by one, and calculates the score. Then, in a case where the score exceeds a threshold, the determination unit 14*c* confirms division at that position. Subsequently, in a case where division is confirmed, the determination unit 14*c* sets a portion after the division as a remaining partial area, and continuously performs division processing. Then, the determination unit 14*c* performs calculation while shifting the possible division positions, and automatically sets the end of the case in a case where the end of the last event is reached.

Figure 7:
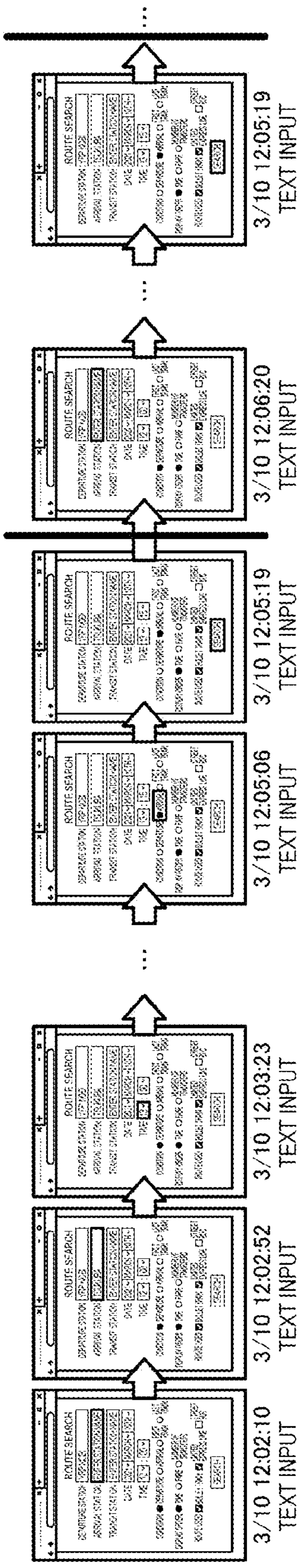
FIG. 7 is a diagram illustrating a display example of an automatic division result.

There are cases where division cannot be performed correctly, such as a case where the number of exemplified cases is small or variety of the exemplified cases is insufficient. For this reason, as illustrated in FIG. 7, the determination unit 14*c* may display an automatic division position instead of immediately confirming a result of automatic division. Then, the determination unit 14*c* may confirm division after confirmation from the user. FIG. 7 is a diagram illustrating a display example of an automatic division result.

For example, in a case where the user determines that the temporarily divided position is inappropriate, the determination unit 14*c* may once cancel the temporary automatic division position and prompt the user to increase the number of exemplifications. By gradually increasing the number of exemplifications by such interactive exchange, it is possible to cause the user to more efficiently exemplify operation events. Further, by providing a UI that allows ON/OFF of various thresholds set in the present embodiment and rules adopted by estimation, it is also possible to respond to more advanced user requirements.

[Processing Procedure by Determination Device]

Figure 8:
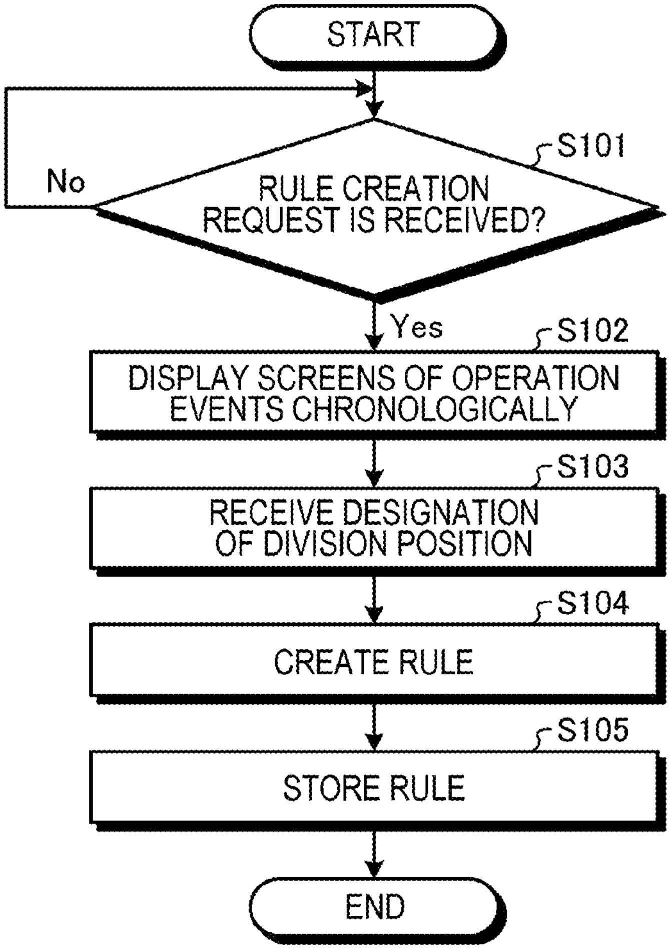
FIG. 8 is a flowchart illustrating an example of a processing procedure of the rule creation processing.
Figure 9:
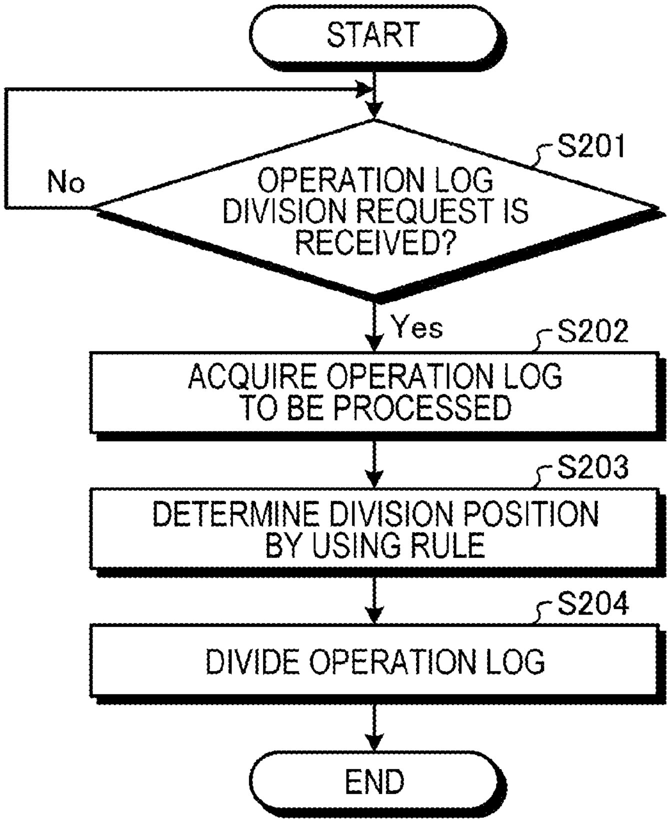
FIG. 9 is a flowchart illustrating an example of a processing procedure of operation log division processing.

Next, an example of a processing procedure of processing executed by the determination device 10 will be described with reference to FIGS. 8 and 9. FIG. 8 is a flowchart illustrating an example of a processing procedure of the rule creation processing. FIG. 9 is a flowchart illustrating an example of a processing procedure of operation log division processing.

First, the processing procedure of the rule creation processing will be described with reference to FIG. 8. As illustrated in FIG. 8, when receiving a rule creation request from the user (Yes in step S101), the reception unit 14*a* of the determination device 10 displays screens of operation events chronologically (step S102). Then, the reception unit 14*a* receives designation of the division position from the user (step S103).

Then, the creation unit 14*b* creates a rule for determining the division position of the operation log on the basis of a relationship between attribute values of the operation events before and after the division position received by the reception unit 14*a* (step S104). Then, the creation unit 14*b* stores the created rule in the rule storage unit 15*b* (step S105).

Next, the processing procedure of the operation log division processing will be described with reference to FIG. 9. As illustrated in FIG. 9, when receiving an operation log division request from the user (Yes in step S201), the determination unit 14*c* acquires the operation log to be processed from the operation log storage unit 15*a* (step S202).

Then, the determination unit 14*c* determines the division position of the operation log to be processed by using the rule created by the creation unit 14*b* (step S203), and divides the operation log on the basis of the determined division position (step S204).

Effects of Embodiments

As described above, the determination device 10 according to the embodiment receives designation of the division position of the operation log, and creates a rule for determining the division position of the operation log on the basis of a relationship between attribute values of operation events before and after the received division position. Then, the determination device 10 determines the division position of the operation log to be processed by using the created rule.

For this reason, the determination device 10 can easily and efficiently perform division of the operation log in units of cases. The determination device 10 can automatically determine the division position in units of cases by the user's exemplification even if there is no deep understanding of an internal structure of a system and the attribute value of the operation log. That is, in the determination device 10, as pre-processing for process mining, it is possible to divide a large amount of operation logs in units of cases with a small operation, and it is possible to efficiently analyze and visualize an operation on a personal computer for finding an improvement point in business.

Figure 10:
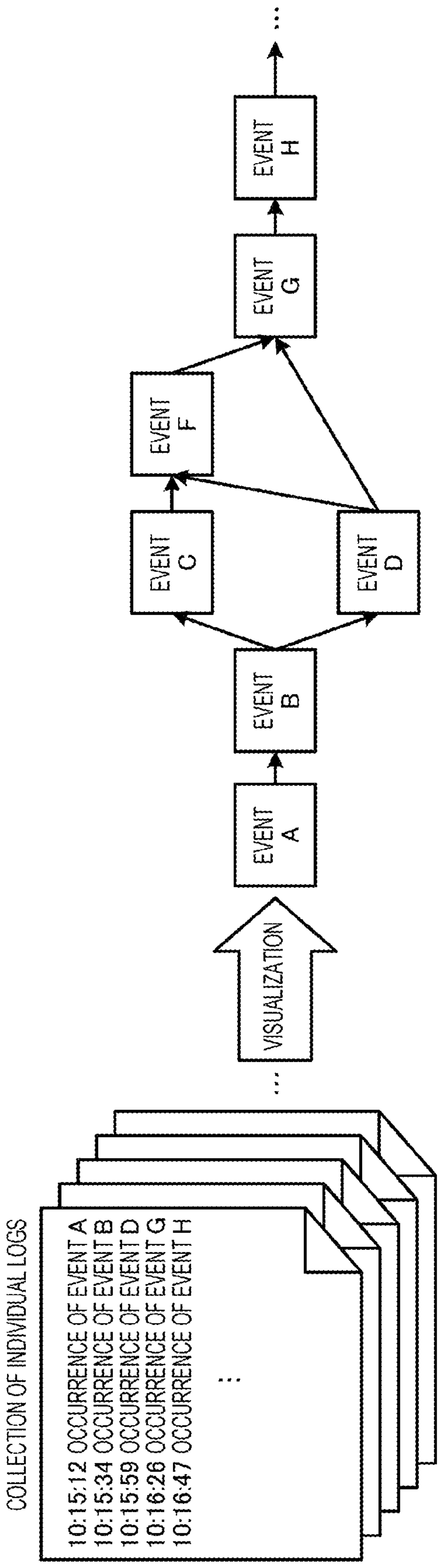
FIG. 10 is a diagram for explaining process mining.

Here, the process mining will be described. In the process mining, as illustrated in FIG. 10, it is possible to analyze a flow of work performed in business by visualizing the order and relationship of events. FIG. 10 is a diagram for explaining the process mining.

Figure 11:
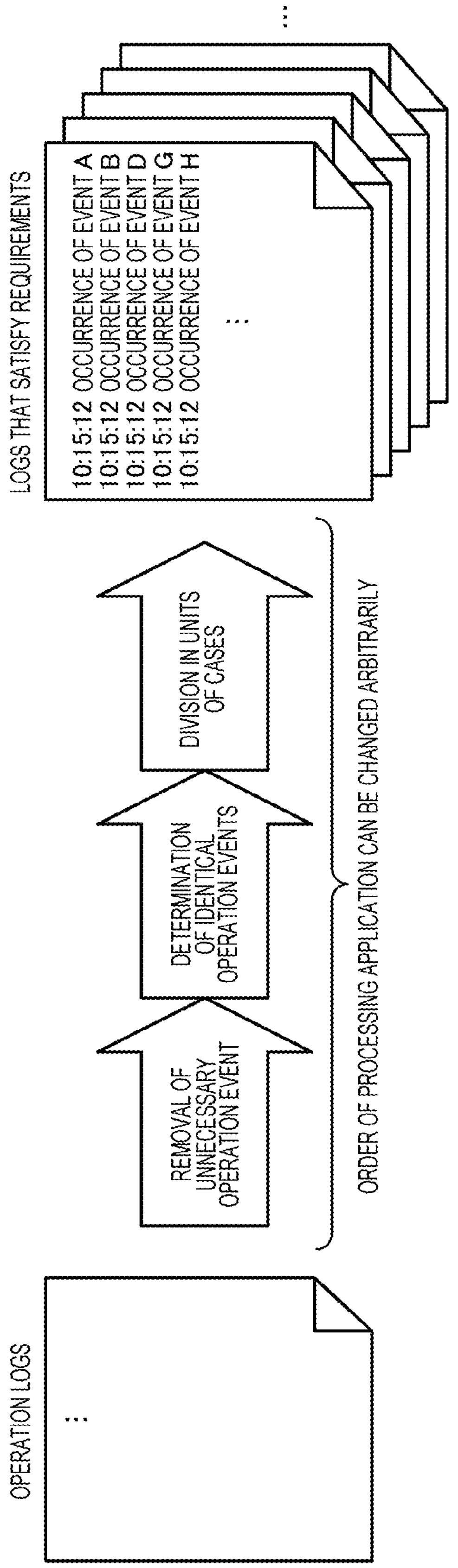
FIG. 11 is a diagram for explaining pre-processing for the process mining.

In such process mining, as illustrated in FIG. 11, when the process mining is performed, for example, "removal of an unnecessary operation event", "determination of identical operation events", and "division in units of cases" are required as the pre-processing. FIG. 11 is a diagram for explaining the pre-processing for the process mining.

Conventionally, such pre-processing is performed manually. For example, when such pre-processing is manually performed, as illustrated in FIG. 12, the user at a site can intuitively exemplify operation events from screen capture, but it may not be easy to process operation logs. FIG. 12 is a diagram for explaining a conventional problem. For example, the attribute value recorded in the operation log requires specialized knowledge for interpretation. For example, to interpret the meaning of the operation log in which the operation on the browser is recorded, knowledge of HTML or document object model (DOM) is required. In addition, URLs and the like may not be completely the same even in the same page. In addition, for example, in a case where a session ID is included, since a part of the URL changes every time login is performed, it is necessary to estimate a URL generation rule to determine the identity of the URL.

As described above, since there is no relationship between appearance in the screen and an internal structure (such as a method of assigning an ID), the internal structure cannot be estimated from similarity in appearance that can be determined by a general user. Since there are various internal structures in the screen, the best determination cannot always be made by a fixed algorithm. A user having specialized knowledge can cope with various screen structures by estimating a rule from a tendency of the operation log and constructing an algorithm, but it is difficult for a general user.

For this reason, in a case where division of the operation log in units of cases is manually performed, it is necessary for a worker to understand an internal structure of a system and a meaning of an attribute value of the operation log, and further, it requires a large operation to handle a large amount of logs, and in addition, in a fixed rule algorithm, systems have different internal structures, so that there has been a problem that it is difficult to automatically divide the operation log in units of cases.

On the other hand, in the determination device 10 according to the embodiment, the rule for determining the division position is created from the relationship between the attribute values of the operation events before and after the division position exemplified by the user, and the division position is automatically determined by using the created rule, so that it is possible to automatically determine the division position in units of cases by the user's exemplification even if there is no deep understanding of an internal structure of a system and the attribute value of the operation log.

[System Configuration or the Like]

Each component of each device that has been illustrated according to the embodiment described above is functionally conceptual and does not necessarily have to be physically configured as illustrated. In other words, a specific form of distribution and integration of individual devices is not limited to the illustrated form, and all or part of the configuration can be functionally or physically distributed and integrated in any unit according to various loads, usage conditions, and the like. Further, all or any part of each processing function performed in each device can be implemented by a CPU and a program to be analyzed and executed by the CPU or can be implemented as hardware by wired logic.

Further, among the individual processing described in the embodiment described above, all or part of the processing described as being automatically performed can be manually performed, or all or part of the processing described as being manually performed can be automatically performed by a known method. In addition, the processing procedure, the control procedure, the specific name, and the information including various data and parameters that are illustrated in the document and the drawings can be freely changed unless otherwise specified.

[Program]

In addition, it is also possible to create a program in which the processing executed by the determination device 10 described in the above embodiment is described in a language that can be executed by a computer. In this case, the computer executes the program, and thus the advantageous effects similar to those of the above-described embodiment can be obtained. Furthermore, the program may be recorded in a computer-readable recording medium, and the program recorded in the recording medium may be read and executed by the computer to implement processing similar to the embodiment described above.

Figure 13:
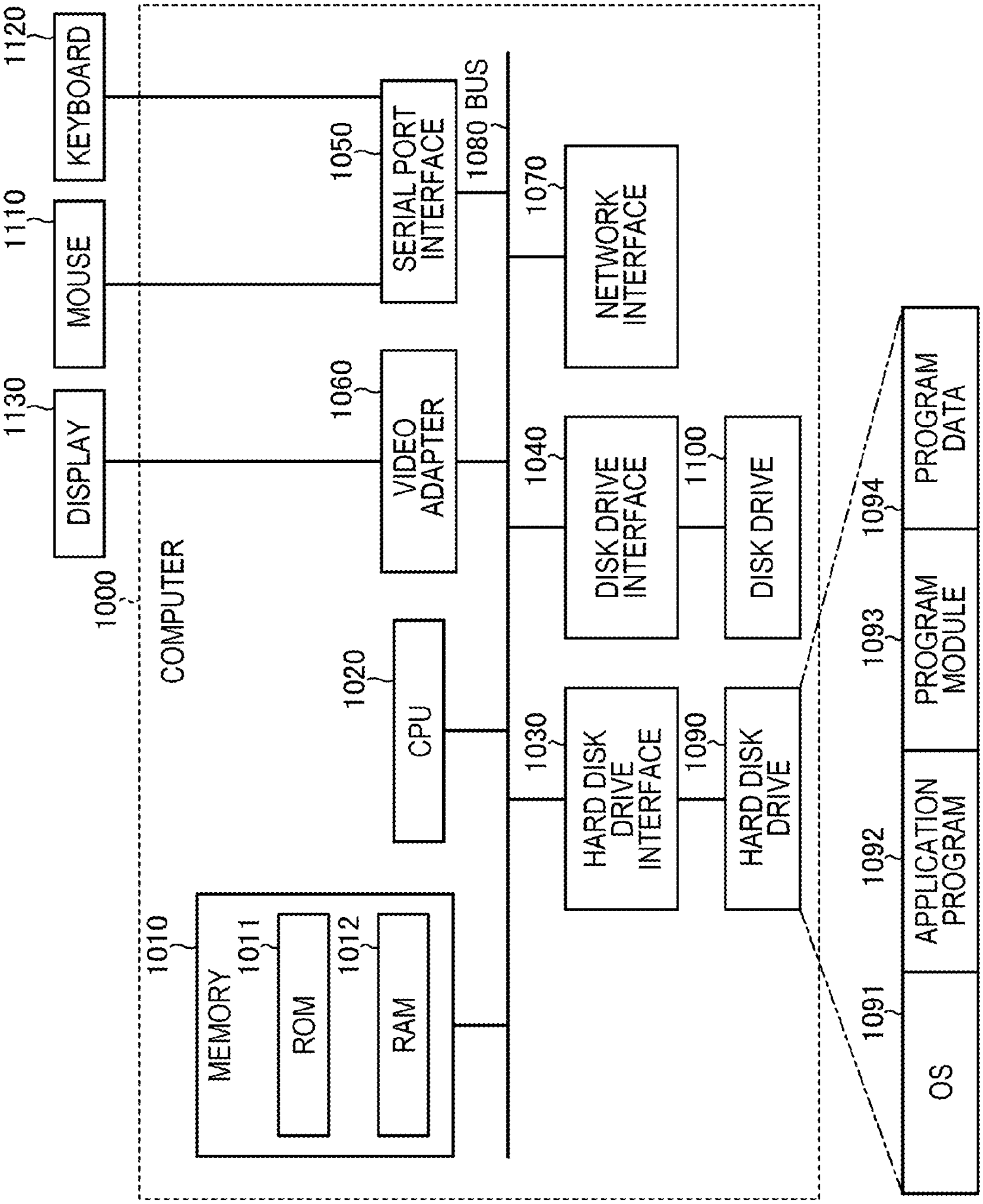
FIG. 13 is a diagram illustrating a computer that executes a program.

FIG. 13 is a diagram illustrating a computer that executes the program. As illustrated in FIG. 13, a computer 1000 includes a memory 1010, a CPU 1020, a hard disk drive interface 1030, a disk drive interface 1040, a serial port interface 1050, a video adapter 1060, and a network interface 1070, for example, and these units are connected to each other by a bus 1080.

As illustrated in FIG. 13, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as illustrated in FIG. 13. The disk drive interface 1040 is connected to a disk drive 1100 as illustrated in FIG. 13. For example, a removable storage medium such as a magnetic disk or an optical disk is inserted into the disk drive 1100. As illustrated in FIG. 13, the serial port interface 1050 is connected to, for example, a mouse 1110 and a keyboard 1120. As illustrated in FIG. 13, the video adapter 1060 is connected to, for example, a display 1130.

Here, as illustrated in FIG. 13, the hard disk drive 1090 stores, for example, an OS 1091, an application program 1092, a program module 1093, and program data 1094. In other words, the above program is stored, for example, in the hard disk drive 1090 as a program module in which a command to be executed by the computer 1000 is described.

Further, various data described in the embodiment described above is stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary and executes various processing procedures.

Note that the program module 1093 and the program data 1094 related to the program are not limited to being stored in the hard disk drive 1090 and may be stored in, for example, a removable storage medium and may be read by the CPU 1020 via a disk drive, or the like. Alternatively, the program module 1093 and the program data 1094 related to the program may be stored in another computer connected via a network (such as a local area network (LAN) or a wide area network (WAN)) and may be read by the CPU 1020 via the network interface 1070.

Although the embodiments to which the invention made by the present inventors is applied have been described above, the present invention is not limited by the description and the drawings forming a part of the disclosure of the present invention according to the present embodiments. In other words, other embodiments, examples, operation techniques, and the like made by those skilled in the art and the like on the basis of the present embodiment are all included in the scope of the present invention.

REFERENCE SIGNS LIST

10 determination device
11 communication processing unit
12 Input unit
13 Output unit
14 Control unit
14*a* reception unit
14*b* creation unit

14*c* determination unit
15 Control unit
15*a* operation log storage unit
15*b* rule storage unit

The invention claimed is:

1. A determination device comprising a processor configured to execute operations comprising:

interactively receiving designation of a division position of a log, wherein the designation represents an interactively selected region in a graphical presentation of a sequence of operations on captured screen images in time series, and the interactively selected region comprises an edge at a beginning of a range of log events in time series and another edge at an end of the range of log events as the division position in time series as specified by interactive drag-and-drop operations;

creating a rule for determining the division position of the log on a basis of a relationship between attribute values of log events before and after the interactively received designation of the division position, wherein the creating further comprises creating the rule for automatically determining the division position of the log on a basis of a length from a start to an end of a log divided by the interactively received designation of the division position and the relationship between the attribute values of the log events before and after the interactively received designation of the division position;

automatically determining and graphically presenting another division position of the log to be processed by execution of the rule according to the interactively received division position of the log to further perform process mining using the log; and providing a graphical user interface in which a user arbitrary turn on/off settings of various thresholds and the created rule.

2. The determination device according to claim 1, wherein the creating further comprises:

estimating an attribute element common to an event after a predetermined number of events from a start of each of logs divided by the received division position, and an attribute element common to an event before a predetermined number of events from an end, and creating the attribute elements common as rules.

3. The determination device according to claim 1, wherein the creating further comprises:

estimating an attribute element common to events in a range up to an event after a predetermined number of events from a start of each of logs divided by the received division position and an attribute element common to events in a range up to an event before a predetermined number of events from an end, and creating the attribute elements common as rules.

4. A determination method, comprising:

Interactively receiving designation of a division position of a log, wherein the designation represents an interactively selected region in a graphical presentation of a sequence of operations on captured screen images in time series, and the interactively selected region comprises an edge at a beginning of a range of log events in time series and another edge at an end of the range of log events as the division position in time series as specified by interactive drag-and-drop operations;

creating a rule for determining the division position of the log on a basis of a relationship between attribute values of log events before and after the interactively received designation of the division position, wherein the creating further comprises creating the rule for automatically determining the division position of the log on a basis of a length from a start to an end of a log divided by the interactively received designation of the division position and the relationship between the attribute values of the log events before and after the interactively received designation of the division position;

automatically determining and graphically presenting another division position of a log to be processed by execution of the rule according to the interactively received designation of the division position of the log to further perform process mining using the log; and providing a graphical user interface in which a user arbitrary turn on/off settings of various thresholds and the created rule.

5. A computer-readable non-transitory recording medium storing a computer-executable program instructions that when executed by a processor cause a computer system to execute operations comprising:

interactively receiving designation of a division position of a log, wherein the designation represents an interactively selected region in a graphical presentation of a sequence of operations on captured screen images in time series, and the interactively selected region comprises an edge at a beginning of a range of log events in time series and another edge at an end of the range of log events as the division position in time series as specified by interactive drag-and-drop operations;

creating a rule for determining the division position of the log on a basis of a relationship between attribute values of log events before and after the interactively received designation of the division position, wherein the creating further comprises creating the rule for automatically determining the division position of the log on a basis of a length from a start to an end of a log divided by the interactively received designation of the division position and the relationship between the attribute values of the log events before and after the interactively received designation of the division position;

automatically determining and graphically presenting another division position of a log to be processed by execution of the rule according to the interactively receiving division position of the log to further perform process mining using the log; and providing a graphical user interface in which a user arbitrary turn on/off settings of various thresholds and the created rule.

6. The determination device according to claim 1, wherein the log includes an operation log of operating a computer by using the graphical user interface.

7. The determination device according to claim 1, wherein the log includes call records using a telephonic device.

8. The determination device according to claim 1, wherein the receiving designation of a division position further comprises interactively receiving the designation using the graphical user interface to specify a range of text selection.

9. The determination method according to claim 4, wherein the creating further comprises:

estimating an attribute element common to an event after a predetermined number of events from a start of each of logs divided by the received division position, and an attribute element common to an event before a predetermined number of events from an end, and creating the attribute elements common as rules.

10. The determination method according to claim 4, wherein the creating further comprises:

estimating an attribute element common to events in a range up to an event after a predetermined number of events from a start of each of logs divided by the received division position and an attribute element common to events in a range up to an event before a predetermined number of events from an end, and creating the attribute elements common as rules.

11. The determination method according to claim 4, wherein the log includes an operation log of operating a computer by using the graphical user interface.

12. The determination method according to claim 4, wherein the log includes call records using a telephonic device.

13. The determination method according to claim 4, wherein the receiving designation of a division position further comprises interactively receiving the designation using the graphical user interface to specify a range of text selection.

14. The computer-readable non-transitory recording medium according to claim 6, wherein the creating further comprises:

estimating an attribute element common to an event after a predetermined number of events from a start of each of logs divided by the received division position, and an attribute element common to an event before a predetermined number of events from an end, and creating the attribute elements common as rules.

15. The computer-readable non-transitory recording medium according to claim 6, wherein the creating further comprises:

estimating an attribute element common to events in a range up to an event after a predetermined number of events from a start of each of logs divided by the received division position and an attribute element common to events in a range up to an event before a predetermined number of events from an end, and creating the attribute elements common as rules.

16. The computer-readable non-transitory recording medium according to claim 5, wherein the log includes an operation log of operating a computer by using the graphical user interface.

17. The computer-readable non-transitory recording medium according to claim 5, wherein the receiving designation of a division position further comprises interactively receiving the designation using the graphical user interface to specify a range of text selection.

* * * * *